US012680438B1

(12) United States Patent
Wang et al.

(10) Patent No.: US 12,680,438 B1
(45) Date of Patent: Jul. 14, 2026

(54) FRACTURING FLUID PAD FLUID FOR OPTIMIZING SIZE OF IN-SITU SELF-GENERATED PROPPANT AND APPLICATION THEREOF

(71) Applicant: CHINA UNIVERSITY OF PETROLEUM(EAST CHINA), Qingdao City (CN)

(72) Inventors: Zengbao Wang, Qingdao City (CN); Weian Huang, Qingdao City (CN); Yuwei Gan, Qingdao City (CN); Yingrui Bai, Qingdao City (CN); Yongping Zhan, Qingdao City (CN); Junjie Jiang, Qingdao City (CN)

(73) Assignee: CHINA UNIVERSITY OF PETROLEUM(EAST CHINA), Qingdao City (CN)

( * ) Notice: Subject to any disclaimer, the term of this patent is extended or adjusted under 35 U.S.C. 154(b) by 0 days.

(21) Appl. No.: 19/360,497

(22) Filed: Oct. 16, 2025

(30) Foreign Application Priority Data

Jun. 3, 2025 (CN) ......................... 202510727106.X

(51) Int. Cl.
*E21B 43/267* (2006.01)
*C09K 8/80* (2006.01)

(52) U.S. Cl.
CPC .............. *E21B 43/267* (2013.01); *C09K 8/80* (2013.01)

(58) Field of Classification Search
CPC .................................................... E21B 43/267
See application file for complete search history.

(56) References Cited

U.S. PATENT DOCUMENTS

2014/0116707 A1* 5/2014 Sarda ........................ C09K 8/74
507/219
2014/0262265 A1* 9/2014 Hutchins ............... E21B 43/267
166/305.1

OTHER PUBLICATIONS

Search Report issued in Chinese Patent Application No. 202510727106. X; dated Jul. 23, 2025; 4 pages.
First Office Action issued in Chinese Patent Application No. 202510727106.X; mailed Jul. 25, 2025; 7 pages.
Notice to Grant issued in Chinese Patent Application No. 202510727106. X; dated Aug. 15, 2025; 3 pages.

* cited by examiner

*Primary Examiner* — William D Hutton, Jr.
*Assistant Examiner* — Avi T Skaist
(74) *Attorney, Agent, or Firm* — HAUPTMAN HAM, LLP

(57) ABSTRACT

A fracturing fluid pad fluid is applicable to a calcium-rich reservoir and composed of clear water, phosphate, pH regulator and $Ca^{2+}$ chelator, wherein, for 100 weight parts of clear water, the content of the phosphate is 1 to 10 weight parts, the volume molar concentration of the pH regulator is 1 to 5 mol/L, and the volume molar concentration of the $Ca^{2+}$ chelator is 0.001 to 1 mol/L; the pH regulator is urea, ammonia water, propanamide and the like, and the $Ca^{2+}$ chelator is EDTA and glutamic acid and the like. The present disclosure increases the average particle size of the proppant particles generated by hydrothermal reaction of formation minerals, thereby improving its propping effect in the formation micro-fractures.

1 Claim, 7 Drawing Sheets

FRACTURING FLUID PAD FLUID FOR OPTIMIZING SIZE OF IN-SITU SELF-GENERATED PROPPANT AND APPLICATION THEREOF

RELATED APPLICATIONS

The present application claims priority from Chinese Application Number 202510727106.X filed Jun. 3, 2025, the disclosure of which is hereby incorporated by reference herein in its entirety.

TECHNICAL FIELD

The present disclosure belongs to the field of petroleum fracturing stimulation technologies and in particular to a fracturing fluid pad fluid for optimizing a size of an in-situ self-generated proppant and an application thereof.

BACKGROUND

The fracturing technology is one of important technologies for oil and gas fields and has been widely applied in the development of the low-permeability oil and gas reservoirs. Hydraulic fracturing is to pump a pad fluid to a target stratum to form a fracture and extend it and then pump a sand-carrying fluid mixed with a proppant; the sand-carrying fluid continues extending the fracture and carries the proppant deep into the fracture; then, a gel breaker of the fracturing fluid is decomposed into a low-viscosity fluid flowing into the well bottom, leaving a high-conductivity channel. The proppant serves as a key material in the oil and gas well fracturing process, with its main function of supporting the fracture formed in the fracturing process and prevent its closure, so as to maintain the flow conductivity of the fracture and guarantee the smooth outflow of the oil and gas.

Hydraulic fracturing is conducive to development and production of oil and gas. But, there are some problems of ease of closure of post-fracturing micro-fractures, difficulty of transportation of proppant in the distal micro-fractures of the fracturing, and poor effective supporting at present, which severely limits the flow conductivity of the fracturing fracture network. Due to small openness of the micro-fractures, the traditional proppants like ceramsite, and quartz sand and the like cannot enter and the micro-fractures have no effecting supporting. During the production process, due to the influences of ground stress and rock elasticity recovery and the like, the micro-fractures without effective supporting tend to close, which lowers the communication ability between the fracturing fracture network and natural fractures, and restricts the efficiency and stability of the fracturing stimulation, thereby leading to rapid decrease of the output of the fractured wells. The research shows that after fracturing, most of the micro-fractures are in an unsupported state, and the volume of the unsupported fractures accounts for above 50% of the fracturing volume.

The openness maintaining of the micro-fractures is one of key stimulation and production stabilization methods of reservoir fracturing. Supporting the micro-fractures with the micro-proppant is the most direct method. But the micro-proppant has the problems of ease of agglomeration, difficult dispersion and the potential risk of plugging the main fracture sanded conductive channel in after-fracturing return flow. The micro-proppant still has large difficulty in transportation to the distal micro-fractures, and especially supporting for the micro-fractures of <150 μm remains to be solved.

In order to realize supporting for the fracturing micro-fractures, the applicant proposes a fracturing micro-fracture in-situ self-generated proppant of a calcium-rich reservoir and a preparation method and application thereof in the Chinese invention patent with the publication number CN118562485A. In the invention patent, a phosphate system is injected into formation fracturing fractures and in the formation environment, the in-situ self-generated proppant is generated by performing hydrothermal synthesis in situ in the calcium-rich reservoir, which can effectively improve the fracture conductivity of the fractured rocks. However, the generated proppant has limited supporting effect due to small particle size, limiting its application scope. Therefore, as one of the main current technical researches, the size of the in-situ self-generated proppant-hydroxylapatite crystal generated through hydrothermal synthesis of formation minerals is to be increased so as to further improve the fracture conductivity.

SUMMARY

One object of the present disclosure is to provide a fracturing fluid pad fluid for optimizing a size of an in-situ self-generated proppant to effectively solve the existing problem of small particle size of the proppant generated through hydrothermal reaction of the formation minerals.

In order to solve the above technical problem, the present disclosure provides the following technical scheme: the fracturing fluid pad fluid for optimizing the size of the in-situ self-generated proppant is applicable to a calcium-rich reservoir and comprises the following raw materials: clear water, phosphate, and pH regulator and/or $Ca^{2+}$ chelator; where, for 100 weight parts of clear water, the content of the phosphate is 1 to 10 weight parts, the volume molar concentration of the pH regulator is 1 to 5 mol/L, and the volume molar concentration of the $Ca^{2+}$ chelator is 0.001 to 1 mol/L.

The phosphate is at least one of diammonium hydrogen phosphate, ammonium dihydrogen phosphate, dipotassium hydrogen phosphate, potassium dihydrogen phosphate, disodium hydrogen phosphate, sodium dihydrogen phosphate and sodium phosphate, the pH regulator is a mixture of one or more of urea, ammonia water, propanamide, sodium carbonate, and sodium bicarbonate, and the $Ca^{2+}$ chelator is a mixture of one or more of Ethylene Diamine Tetraacetic Acid (EDTA), EDTA disodium salt, EDTA trisodium salt, EDTA tetrasodium salt, citric acid, monosodium citrate, disodium citrate, trisodium citrate, glutamic acid, etidronic acid, amino trimethylene phosphonic acid, and diethylene triamine pentaacetic acid.

Furthermore, for 100 weight parts of clear water, the the content of the phosphate is 5 to 7 weight parts, the volume molar concentration of the pH regulator is 1 to 2 mol/L, and the volume molar concentration of the $Ca^{2+}$ chelator is 0.001 to 1 mol/L.

Furthermore, the calcium content of formation core minerals in the calcium-rich reservoir is greater than 50%.

Another object of the present disclosure is to provide an application of the fracturing fluid pad fluid for optimizing the size of the in-situ self-generated proppant mentioned in the above example. The application comprises the following steps: S1, after weighing phosphate and clear water based on a preset blending ratio, and adding the phosphate into the clear water and stirring until the phosphate is fully dissolved; S2, adding a pH regulator and/or a $Ca^{2+}$ chelator into the solution prepared in the step S1 to prepare the fracturing fluid pad fluid; S3, injecting the fracturing fluid pad fluid into micro-fractures in a calcium-rich reservoir for reeaction of 12 to 48 hours, synthesizing a hydroxylapatite crystal hydrothermally by using a formation temperature (the formation temperature of medium and shallow formations usually can reach 80 to 120° C.), and generating the in-situ self-generated proppant on the surface of the micro-fractures of the calcium-rich reservoir.

Compared with the prior arts, the present disclosure has the following beneficial effects: in the present disclosure, the pH regulator and/or $Ca^{2+}$ chelator are added into the phosphate system, and the pH regulator can perform decomposition or hydrolysis reaction under high-temperature hydrothermal condition to form a buffer system, which increases the pH value of the reaction system slowly and inhibit nucleation rate. In this way, ions are enabled to deposit on existing crystal nucleus preferentially, promoting crystal growth rather than nucleation and finally forming large-size crystals. The $Ca^{2+}$ chelator can form a stable water-soluble chelate with $Ca^{2+}$ and lower the concentration of free $Ca^{2+}$ in the solution. The lower $Ca^{2+}$ concentration leads to lower ion supersaturation in the solution, inhibiting the nucleation rate and promoting the crystals to grow into larger particles.

Therefore, the present disclosure increases the average particle size of the proppant particles generated through hydrothermal reaction of formation minerals and improves the supporting effect of the in-situ self-generated proppant in the formation micro-fractures, which further helps improve fracture conductivity and heightens fracturing stimulation effect of the oil and gas. The method in the present disclosure features simple operation and wide raw material sources.

BRIEF DESCRIPTIONS OF THE DRAWINGS

DETAILED DESCRIPTIONS OF EMBODIMENTS

Example 1: this example provides an application of a fracturing fluid pad fluid for optimizing a size of an in-situ self-generated proppant. The phosphate used in the example is sodium dihydrogen phosphate and the pH regulator used is urea with the volume molar concentration of 1 mol/L.

Figure 13:
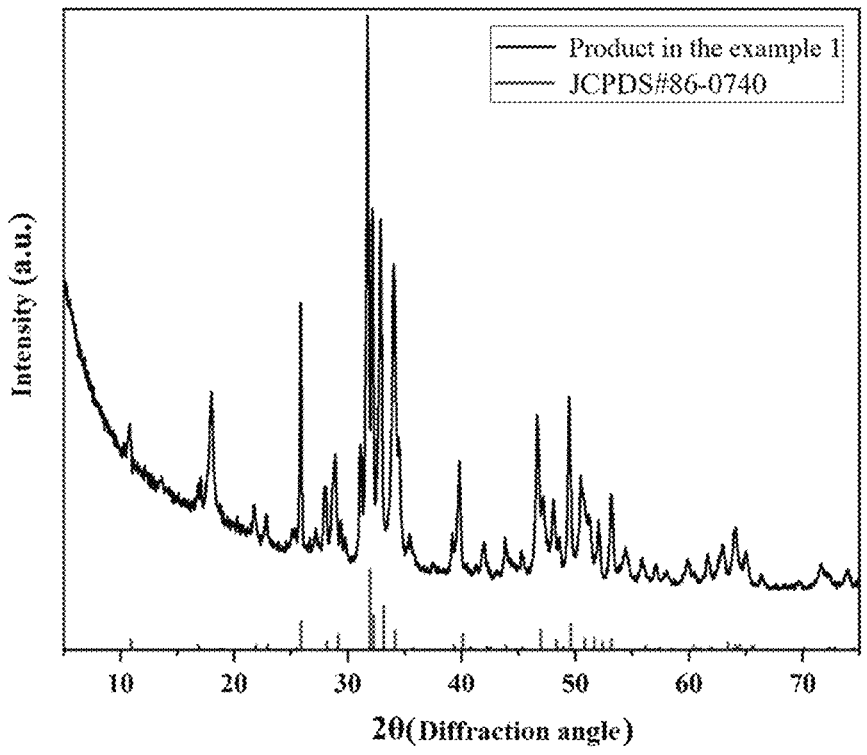
FIG. 13 is an X-ray diffraction diagram of an in-situ self-generated proppant obtained by separation in an example 1, where JCPDS #86-0740 comes from diffraction data of standard powder of hydroxylapatite of International Diffraction Data Center.

The fracturing fluid pad fluid is prepared with 100 weight parts of clear water, 7 weight parts of sodium dihydrogen phosphate and urea, and excess calcium carbonate is added into the prepared fracturing fluid pad fluid, and stirred evenly and then sealed with a plastic wrap, and then placed into a 90° C. electric heating oven for reaction of 24 h; after reaction, the un-reacted calcium carbonate is separated out, and dried to obtain the in-situ self-generated proppant particles. X-ray diffraction analysis is performed on the in-situ self-generated proppant obtained by separation (product in example 1). It can be seen from FIG. 13 that the main constituent of the in-situ self-generated proppant is hydroxylapatite.

The specific method of separating out the un-reacted calcium carbonate after reaction is detailed in the Chinese invention patent with the publication number CN118562485A as below: because the decomposition temperature of the calcium carbonate is 825° C. and the decomposition temperature of the in-situ self-generated proppant is 1200° C., the filtered solid mixture is placed into a 900° C. muffle furnace for high-temperature calcination to decompose calcium carbonate in the solid mixture into calcium oxide and carbon dioxide; after the solid mixture of calcium oxide and proppant is obtained, an $NH_4Cl$ solution with the volume concentration of 20% is prepared, and then added into a solid mixture of calcium oxide and proppant and then placed into a 50° C. thermostat water bath kettle for reaction of 0.5 to 1 h; after reaction, the solution is filtered and the reaction is repeated 3 to 5 times until no visible irritating odor is given out or the solution reaches pH 7; at this time, it is considered that full reaction is completed; the reacted solution is filtered and dried to obtain the in-situ self-generated proppant particles. In this way, the un-reacted calcium carbonate is separated out from the mixture to obtain the in-situ self-generated proppant particles.

Figure 14:
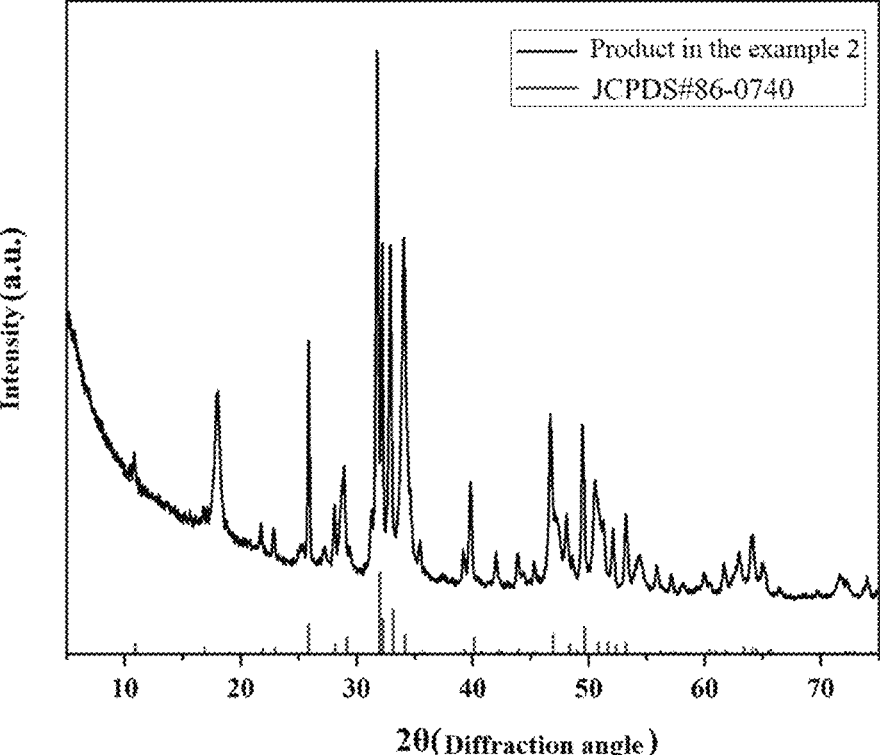
FIG. 14 is an X-ray diffraction diagram of an in-situ self-generated proppant obtained by separation in an example 2, where JCPDS #86-0740 comes from diffraction data of standard powder of hydroxylapatite of International Diffraction Data Center.

Example 2: based on the example 1, in this example, $Ca^{2+}$ chelator-EDTA with the volume molar concentration of 1 mol/L is added and the ratio of the molar numbers of EDTA and calcium carbonate is 1:1, and other raw materials and reaction conditions are unchanged. After the reaction is completed, the un-reacted calcium carbon is separated out and dried to obtain the in-situ self-generated proppant particles. X-ray diffraction analysis is performed on the in-situ self-generated proppant obtained by separation (product in example 2). It can be seen from FIG. 14 that the main constituent of the in-situ self-generated proppant is hydroxylapatite.

Example 3: in this example, the phosphate used is sodium dihydrogen phosphate and the $Ca^{2+}$ chelator is EDTA with the volume molar concentration of 0.001 mol/L.

In this example, a solution is prepared with 100 weight parts of clear water, 7 weight parts of sodium dihydrogen phosphate and 0.001 mol/L EDTA, and excess calcium carbonate is added into the prepared solution, and stirred evenly and then sealed with a plastic wrap, and then placed into a 90° C. electric heating oven for reaction of 24 h; after reaction, the un-reacted calcium carbonate is separated out, and dried to obtain the in-situ self-generated proppant particles.

Example 4: this example differs from the example 3 in that: in this example, the $Ca^{2+}$ chelator used is EDTA with the volume molar concentration of 0.003 mol/L.

Example 5: the phosphate used in this example is sodium dihydrogen phosphate, the pH regulator used is urea with the volume molar concentration of 1 mol/L, and the $Ca^{2+}$ chelator used is glutamic acid with the volume molar concentration of 0.5 mol/L.

A fracturing fluid pad fluid is prepared with 100 weight parts of clear water, 7 weight parts of sodium dihydrogen phosphate, 0.5 mol/L glutamic acid (7 weight parts) and 1 mol/L urea, and excess calcium carbonate is added into the prepared fracturing fluid pad fluid, and stirred evenly and then sealed with a plastic wrap, and then placed into a 90° C. electric heating oven for reaction of 24 h; after reaction, the un-reacted calcium carbonate is separated out, and dried to obtain the in-situ self-generated proppant particles.

Example 6: this example differs from the example 5 in that: the $Ca^{2+}$ chelator used in this example is glutamic acid with the volume molar concentration of 1 mol/L.

Figure 11:
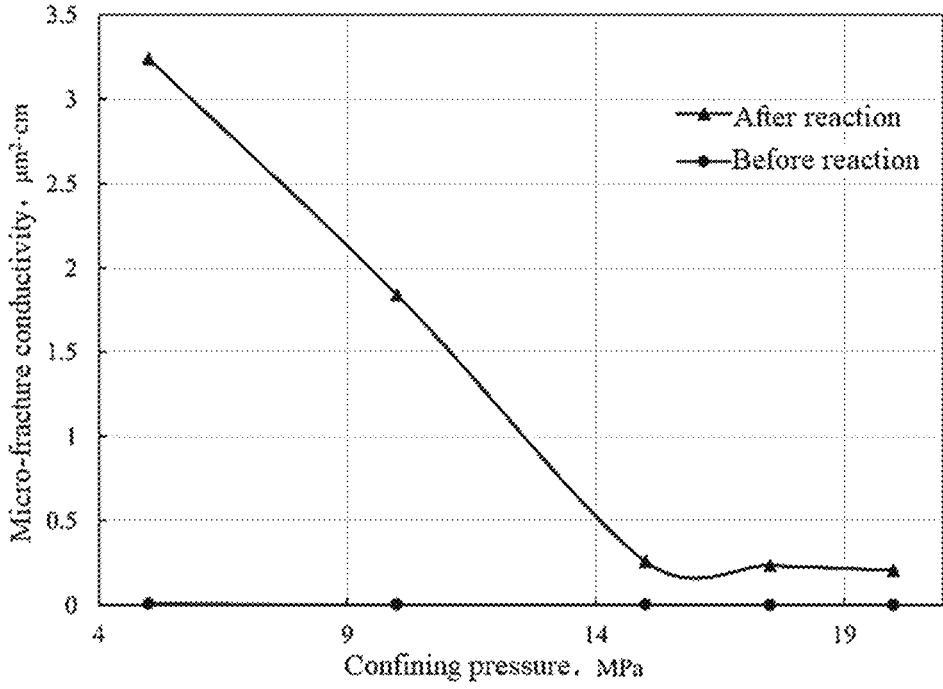
FIG. 11 is a contrast diagram of micro-fracture conductivities before and after reaction in an example 7.

Example 7: A fracturing fluid pad fluid is prepared with 100 weight parts of clear water, 7 weight parts of sodium dihydrogen phosphate, and EDTA with the volume molar concentration of 0.001 mol/L. A carbonate rock core with the calcium content of over 90% is selected (in this example, in order to achieve visible effect and facilitate observation and comparison, a core with the calcium content of over 90% is selected. Theoretically, the in-situ self-generated proppant can be generated as long as calcium mineral is present in the rock minerals. But the effect depends on the content and distribution of the calcium mineral in the rock minerals, for example, an ideal effect can be achieved when the calcium mineral content is over 50%.) The core micro-factures are prepared by using wire cutting process to simulate the formation micro-fractures, and the fracturing fluid pad fluid is injected into the micro-fractures of the test core for reaction of 24 h at the temperature of 80° C. to generate in-situ proppant on the surface of the core micro-fractures. The micro-fracture conductivity under different confining pressures before and after reaction is tested, with the test results in FIG. 11. The results show that the core micro-fracture conductivity after reaction is greatly increased, and the micro-fracture conductivity under the high confining pressure of 20 MPa is about 146 times that before reaction.

Control example 1: in this control example, a fracturing fluid pad fluid is prepared with 100 weight parts of clear water, and 5 weight parts of sodium dihydrogen phosphate. Excess calcium carbonate is added into the prepared fracturing fluid pad fluid, and stirred evenly and then sealed with a plastic wrap, and then placed into a 90° C. electric heating oven for reaction of 24 h; after reaction, the un-reacted calcium carbonate is separated out, and dried to obtain the in-situ self-generated proppant particles.

Control example 2: this control example differs from the control example 1 in that: the addition amount of sodium dihydrogen phosphate is 7 weight parts.

Figure 12:
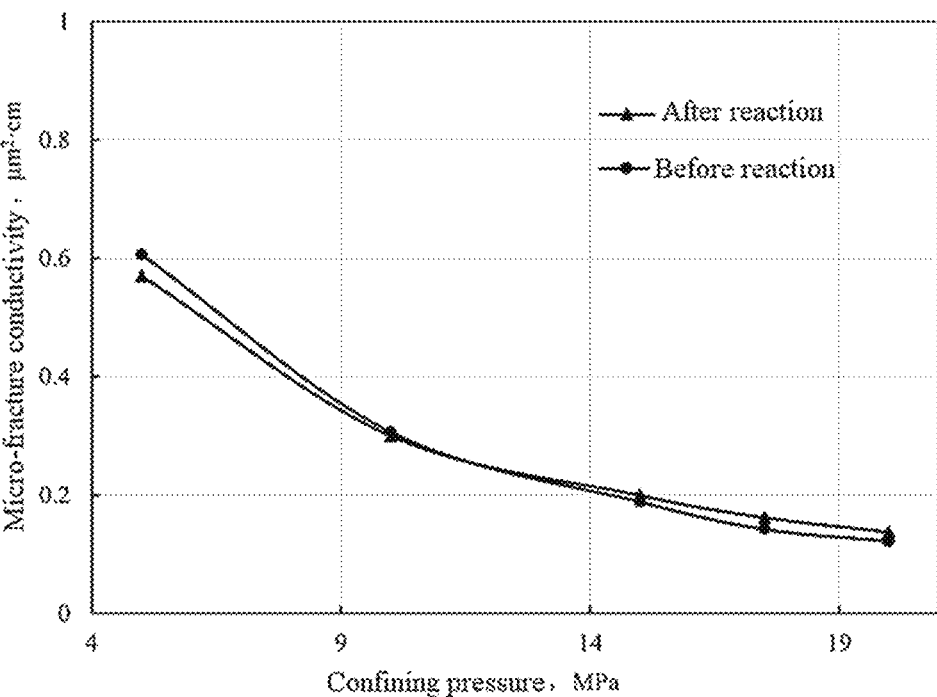
FIG. 12 is a contrast diagram of micro-fracture conductivities before and after reaction in a control example 3.

Control example 3: in this control example, a fracturing fluid pad fluid is prepared with 100 weight parts of clear water, and 7 weight parts of sodium dihydrogen phosphate. A carbonate rock core with the calcium content of over 90% is selected as well. The core micro-factures are prepared by using wire cutting process to simulate the formation micro-fractures, and the fracturing fluid pad fluid is injected into the micro-fractures of the test core for reaction of 24 h at the temperature of 80° C. to generate in-situ proppant on the surface of the core micro-fractures. Under the same conditions as in the example 7, the micro-fracture conductivity under different confining pressures before and after reaction is tested, with the test results in FIG. 12. The results show that the core micro-fracture conductivity before and after reaction changes invisibly.

By using a laser particle size analyzer, particle size test is performed on the in-situ self-generated proppant particles in the examples 1 to 6 and control examples 1 to 2, with the test results in FIGS. 1 to 8 and Table 1. The medium particle size of the proppant particles prepared in each example is greater than the medium particle size of the proppant particles prepared in the control examples 1 and 2 for the following reason: the pH regulator can perform decomposition or hydrolysis reaction under high-temperature hydrothermal conditions to form a buffer system, which increases the pH value of the reaction system slowly and inhibit nucleation rate. In this way, ions are enabled to deposit on existing crystal nucleus preferentially, promoting crystal growth rather than nucleation and finally forming large-size crystals. The $Ca^{2+}$ chelator can form a stable water-soluble chelate with $Ca^{2+}$ and lower the concentration of free $Ca^{2+}$ in the solution. The lower $Ca^{2+}$ concentration leads to lower ion supersaturation in the solution, inhibiting the nucleation rate and promoting the crystals to grow into larger particles.

The proppant particles prepared in the example 2, example 5 and example 6 (adding pH regulator and $Ca^{2+}$ chelator) have significantly-increased medium particle size, and especially the medium particle size of the proppant particles prepared in the example 5 and example 6 is substantively increased. Compared with the particle size of the proppant particles in the control example 1, the particle size of the proppant particles in the example 2 is increased by about 621.53%, and compared with the particle size of the proppant particles in the control example 2, the particle size of the proppant particles in the example 2 is increased by about 135.14%; compared with the particle size of the proppant particles in the control example 1, the particle size of the proppant particles in the example 5 is increased by about 9323.44%; compared with the particle size of the proppant particles in the control example 2, the particle size of the proppant particles in the example 5 is increased by about 2971.03%; compared with the particle size of the proppant particles in the control example 1, the particle size of the proppant particles in the example 6 is increased by about 7410.64%, and compared with the particle size of the proppant particles in the control example 2, the particle size of the proppant particles in the example 6 is increased by about 2347.66%. This shows that the pH regulator and the $Ca^{2+}$ chelator can cooperatively extend the growth period of the proppant crystals, promoting the formation of large particles; and the $Ca^{2+}$ chelators of different types and concentrations can also have impact on the particle size of the proppant particles.

TABLE 1

| medium particle sizes of the proppant particles in each example and control example | |
| --- | --- |
| | Medium particle size/µm |
| Example 1 | 34.99 |
| Example 2 | 55.94 |
| Example 3 | 32.35 |
| Example 4 | 37.34 |
| Example 5 | 730.6 |
| Example 6 | 582.3 |
| Control example 1 | 7.753 |
| Control example 2 | 23.79 |

Figure 1:
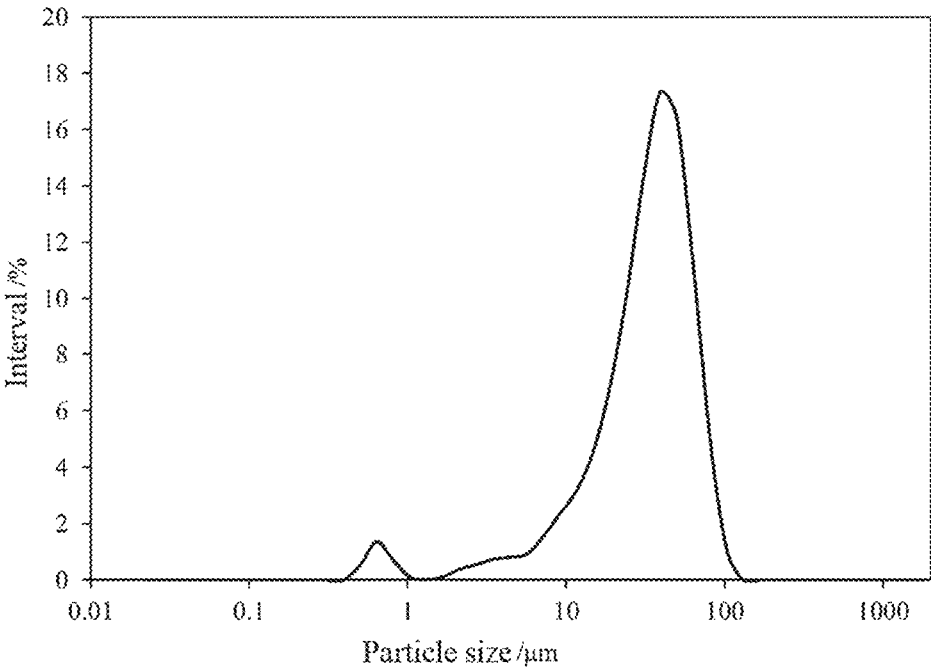
FIG. 1 is a particle size distribution diagram of in-situ self-generated proppant particles in an example 1.
Figure 2:
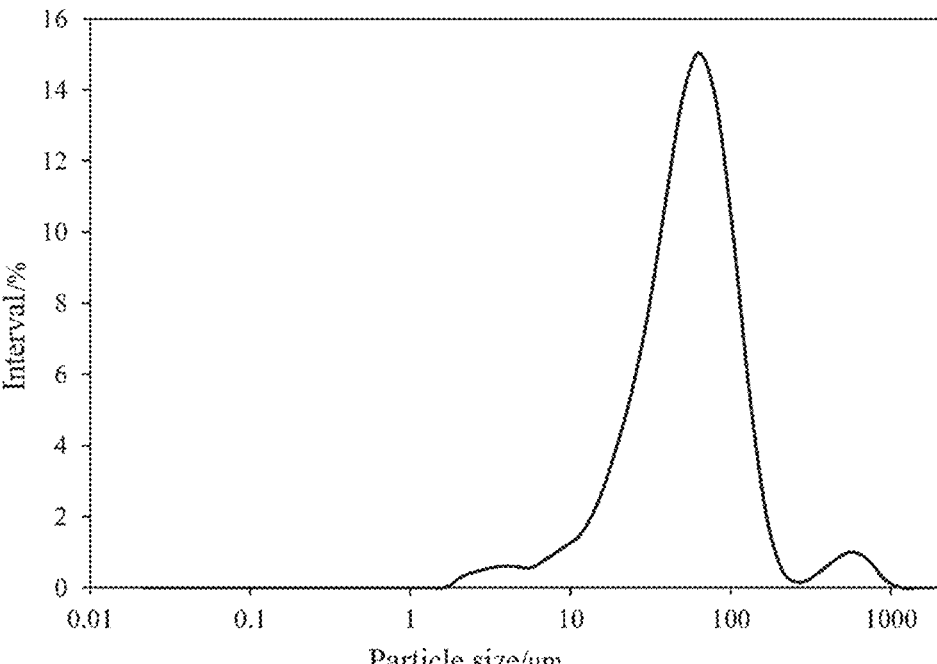
FIG. 2 is a particle size distribution diagram of in-situ self-generated proppant particles in an example 2.
Figure 3:
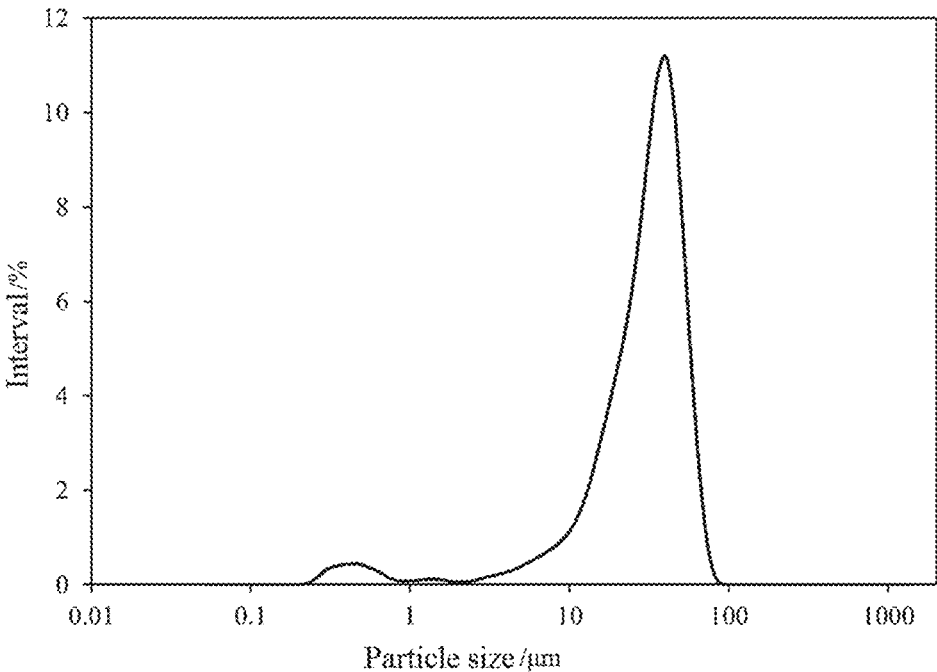
FIG. 3 is a particle size distribution diagram of in-situ self-generated proppant particles in an example 3.
Figure 4:
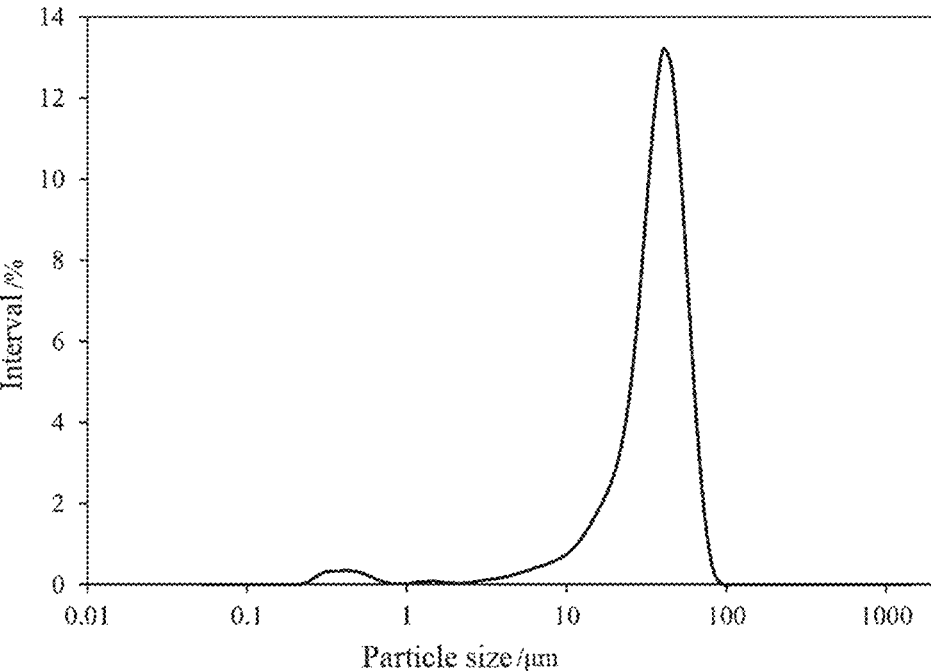
FIG. 4 is a particle size distribution diagram of in-situ self-generated proppant particles in an example 4.
Figure 5:
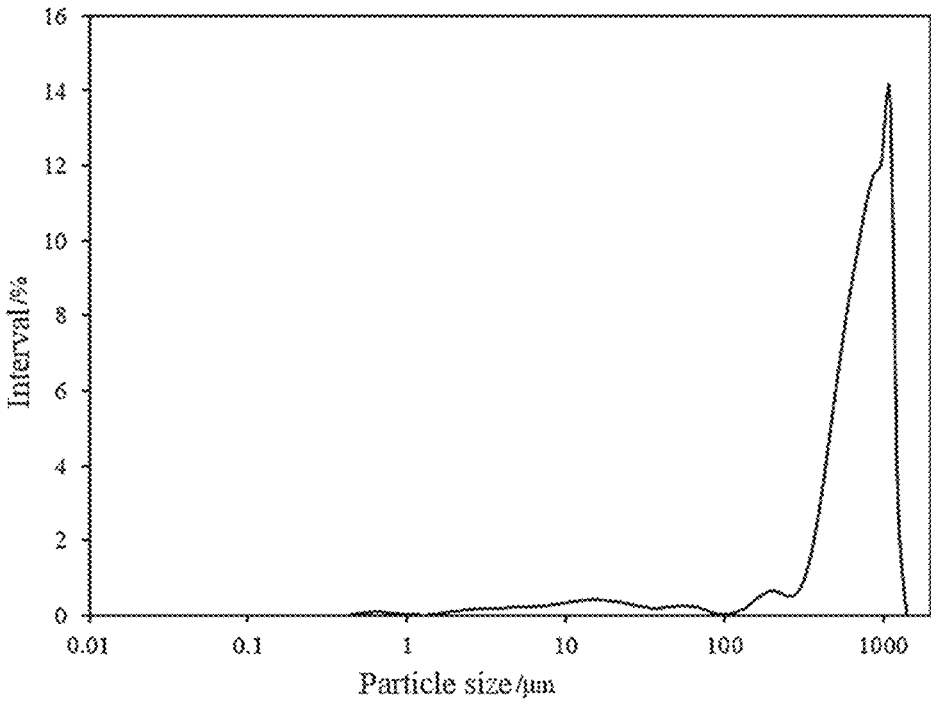
FIG. 5 is a particle size distribution diagram of in-situ self-generated proppant particles in an example 5.
Figure 6:
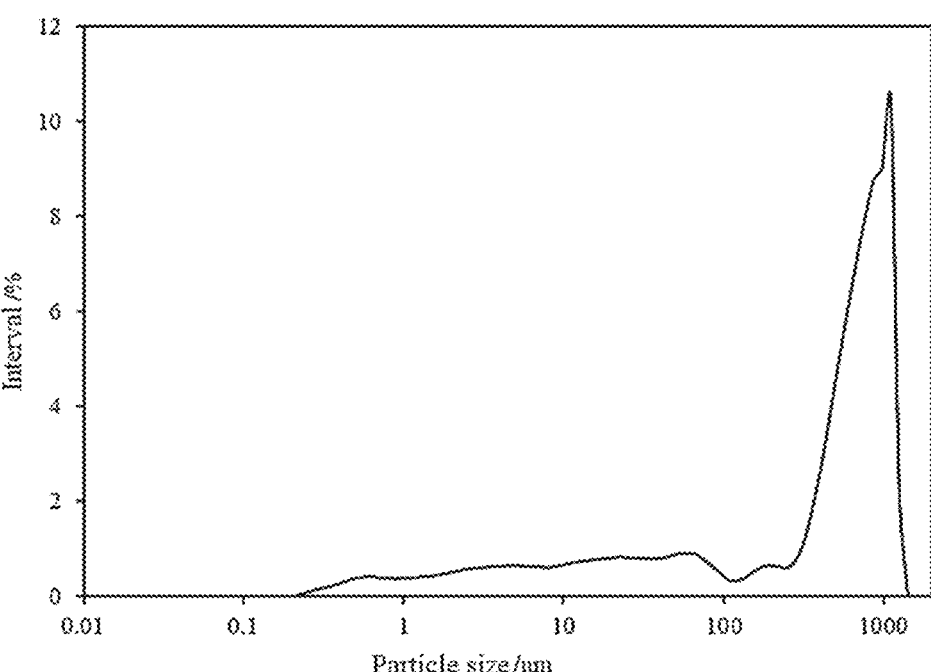
FIG. 6 is a particle size distribution diagram of in-situ self-generated proppant particles in an example 6.
Figure 7:
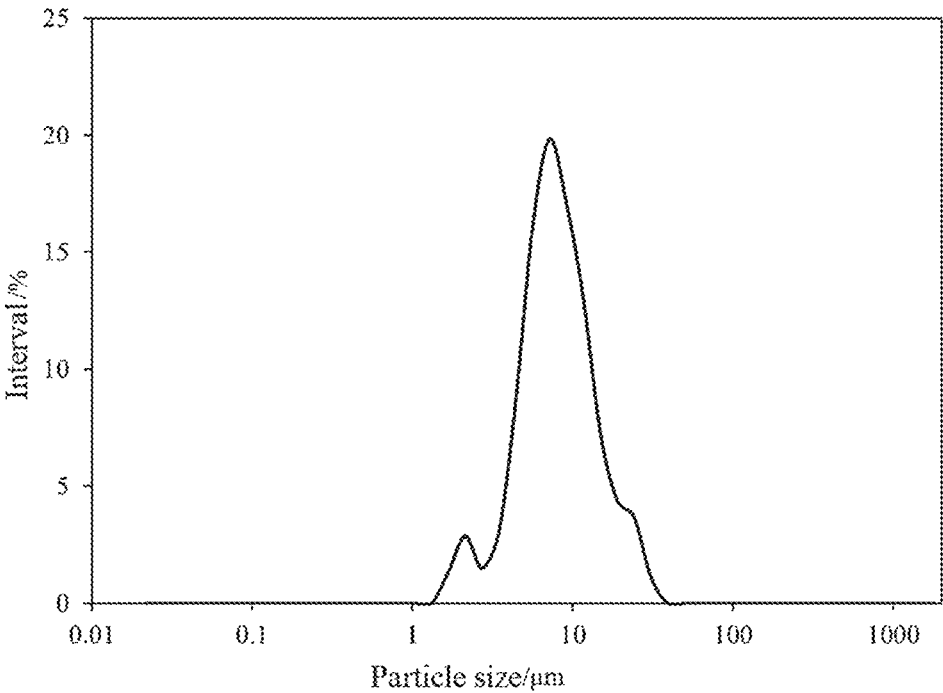
FIG. 7 is a particle size distribution diagram of in-situ self-generated proppant particles in a control example 1.
Figure 8:
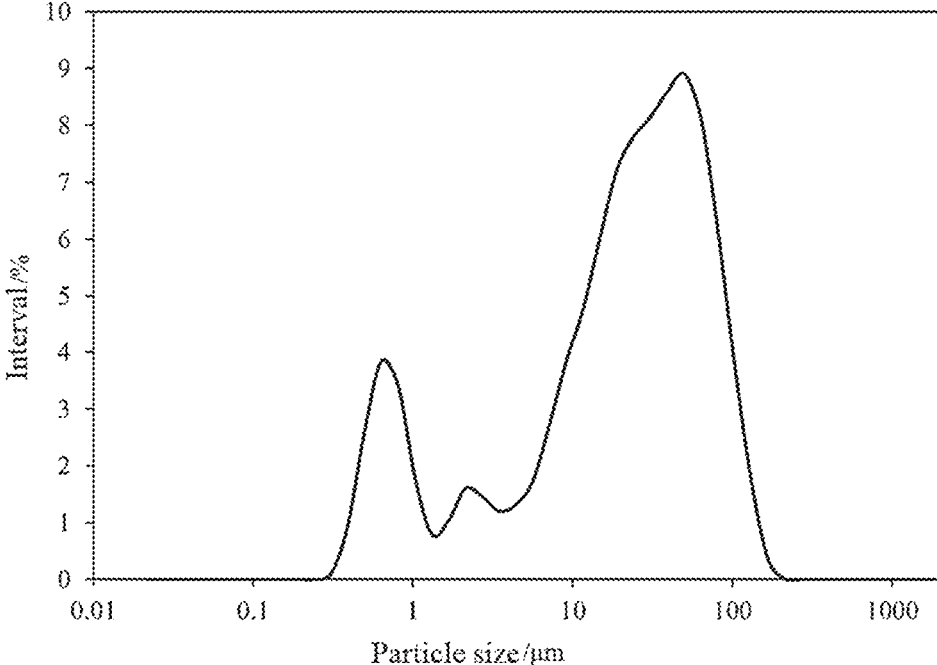
FIG. 8 is a particle size distribution diagram of in-situ self-generated proppant particles in a control example 2.
Figure 9:
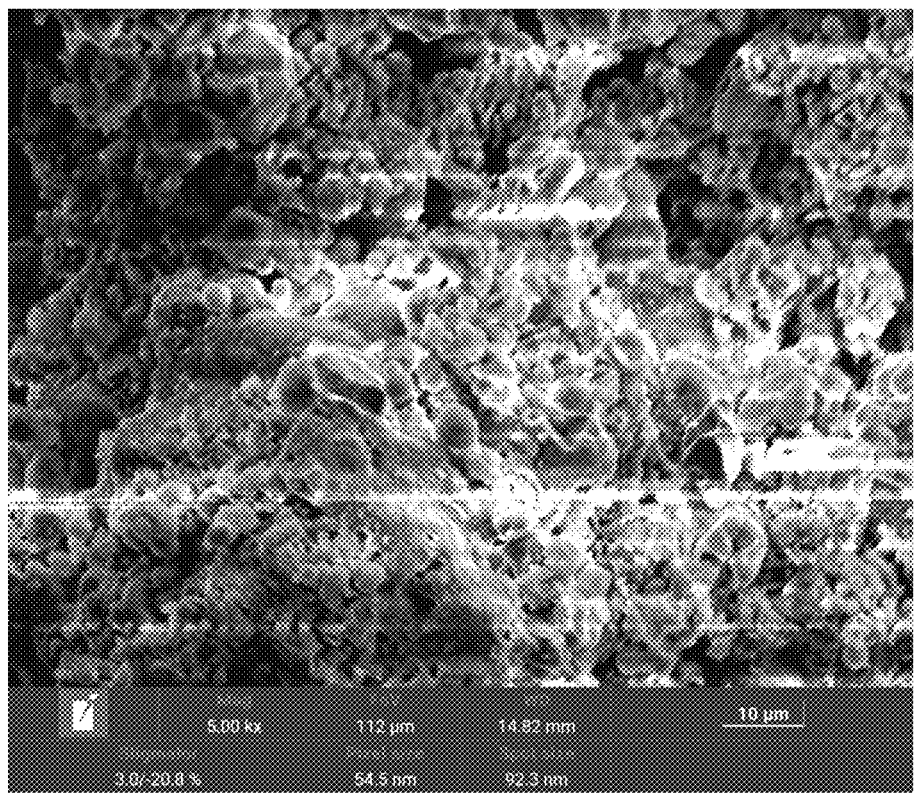
FIG. 9 is an electron microscope image of in-situ self-generated proppant particles enlarged 5000 times in an example 1.
Figure 10:
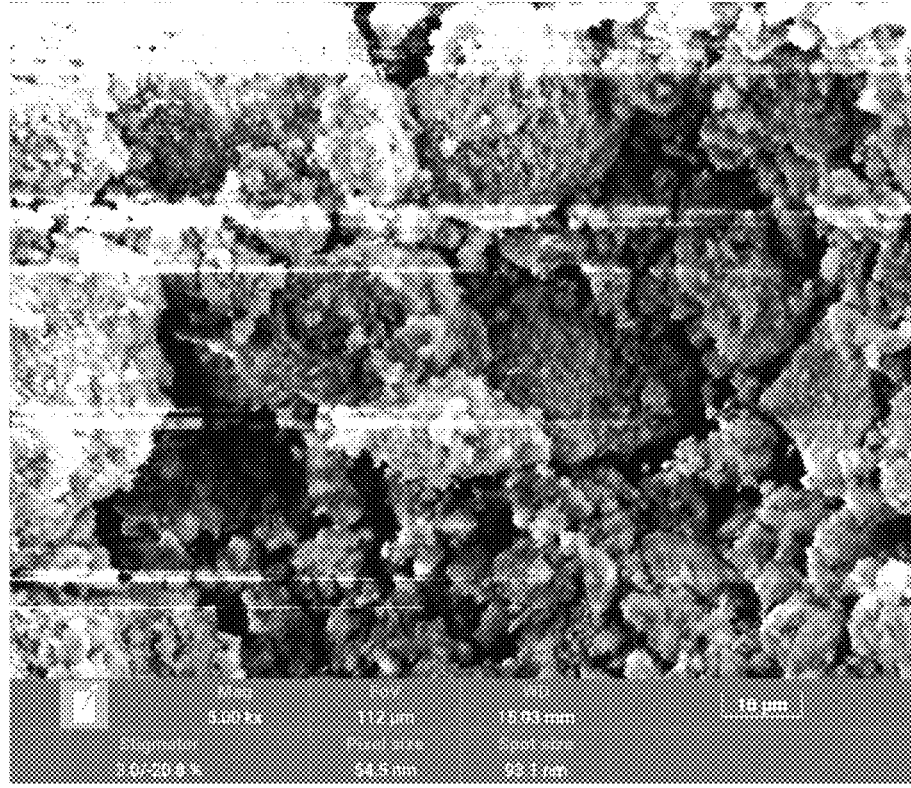
FIG. 10 is an electron microscope image of in-situ self-generated proppant particles enlarged 5000 times in a control example 1.

Observation test is performed with Scanning Electron Microscope (SEM) on the proppant particles prepared in the example 1 and control example 1, with the test results in FIGS. 9 and 10. The micro size of the proppant particles prepared in the example 1 under a same magnification factor is obviously greater than that of the proppant particles prepared in the control example 1.

By comparison of the example 7 and the control example 3, it can be known that by adding the pH regulator and/or $Ca^{2+}$ chelator in the process of preparation of the fracturing fluid pad fluid of the fracturing micro-fracture in-situ self-generated proppant of the calcium-rich reservoir in the Chinese invention patent with the publication number CN118562485A, the present disclosure effectively increases the generation size of the in-situ proppant, which improves the propping effect and further improves the fracture conductivity and long-term stability, thereby optimizing the gas and oil extraction efficiency. It is noted that different from the proppant prepared by other methods on the market, the proppant prepared in situ by hydrothermal reaction of formation minerals is optimized in size by the present disclosure.

Of course, the above descriptions do not constitute limitation to the present disclosure and the present disclosure is not limited to the above examples. All changes, variations, additions or replacements made by those skilled in the arts within the essence scope of the present disclosure shall fall within the scope of protection of the present disclosure.

The invention claimed is:

1. A fracturing fluid pad fluid for optimizing a size of an in-situ self-generated proppant, applicable to a calcium-containing reservoir, wherein, the mass fraction of calcium in formation minerals in the calcium-containing reservoir is greater than 50%, and the fracturing fluid pad fluid consisting of:

water, phosphate, pH regulator and $Ca^{2+}$ chelator, wherein, for 100 weight parts of water, the content of the phosphate is 7 weight parts, the volume molar concentration of the pH regulator is 1 mol/L, and the volume molar concentration of the $Ca^{2+}$ chelator is 0.5 to 1 mol/L;

the phosphate is at least one of diammonium hydrogen phosphate, ammonium dihydrogen phosphate, dipotassium hydrogen phosphate, potassium dihydrogen phosphate, disodium hydrogen phosphate, sodium dihydrogen phosphate and sodium phosphate, the pH regulator is urea, and the $Ca^{2+}$ chelator is glutamic acid.

* * * * *